Figure 1:
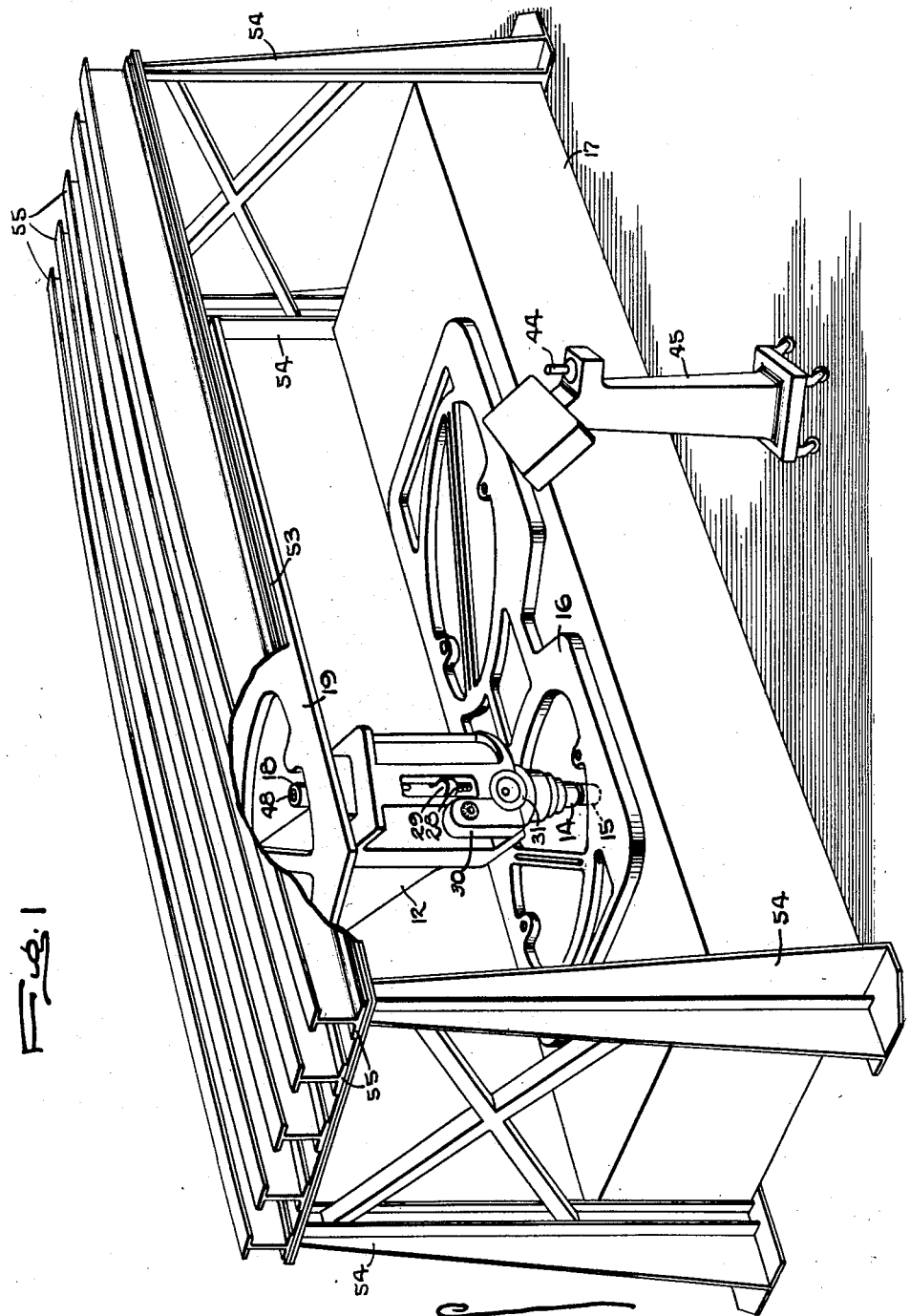

Dec. 16, 1958 T. C. MANN 2,864,283
POWER OPERATED ROUTER
Filed July 8, 1955 2 Sheets-Sheet 1

INVENTOR
Theodore C. Mann
by Carlson, Pitzner, Hubbard + Wolfe
ATTORNEY

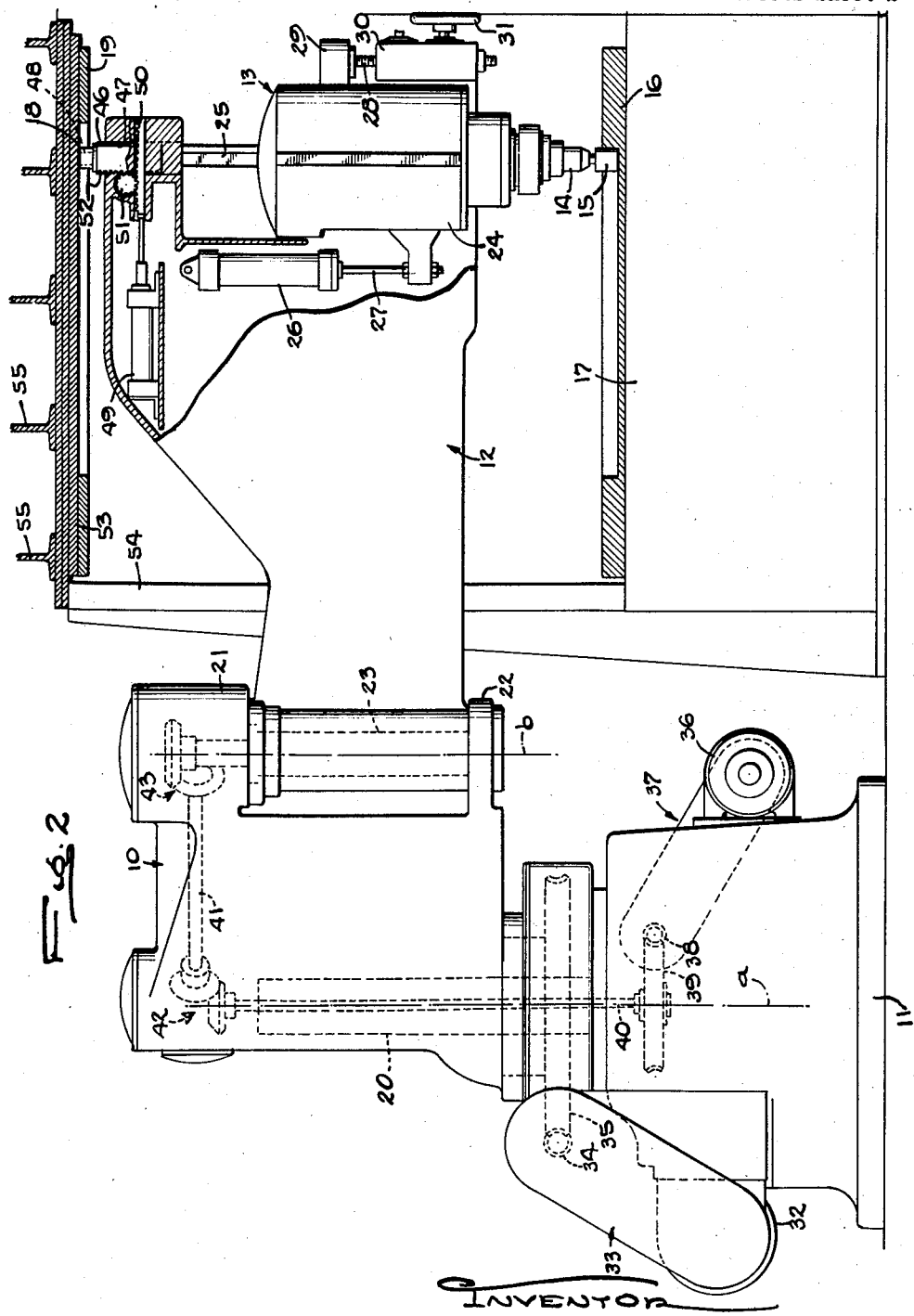

United States Patent Office 2,864,283
Patented Dec. 16, 1958

2,864,283

POWER OPERATED ROUTER

Theodore C. Mann, Beloit, Wis., assignor to Ekstrom-Carlson & Co., Rockford, Ill., a corporation of Illinois Application July 8, 1955, Serial No. 520,823

1 Claim. (Cl. 90—13.2)

This invention relates to a router of the type in which an arm carrying a cutting tool and a template follower at its outer end is pivoted at its other end on one end of a second or inner arm which, in turn, is pivotally supported at its other end on a base to swing about a fixed axis. More particularly, the invention has reference to a router in which power actuators tend to turn the arms so as to produce a resultant force which holds the follower against a template and moves the follower along the latter whereby the tool follows a path corresponding to the template contour.

The general object of the invention is to provide a new and improved router of the above character in which the parts are arranged in a novel manner as to improve the accuracy of the router, render the latter more versatile and simplify its use and operation.

A more detailed object is to achieve the foregoing object by mounting the follower coaxially with the cutter but spaced above the latter so as to permit the template to be mounted wholly independently of the workpiece.

Other objects and advantages of the invention will become apparent from the following detailed description taken in connection with the accompanying drawings, in which Figure 1 is a fragmentary perspective view of a router embodying the novel features of the present invention.

Fig. 2 is a side elevation with parts broken away and shown in section.

As shown in the drawings for purposes of illustration, the invention is embodied in a double arm router comprising an elongated horizontal inner arm 10 (Fig. 2) pivotally mounted at one end to a stationary base 11 to swing about an upright axis $a$ and a similar outer arm 12 pivotally connected at one end to the outer end of the arm 10 to swing about a second vertical axis $b$. On the free end of the outer arm is a tool head 13 supporting a vertical power rotated spindle 14. A tool 15, such as an ordinary milling cutter, is fast on the lower end of the spindle for engagement with a workpiece 16 which is secured to the top of a table 17. The tool is fed through the work by swinging the arms 10 and 12 and is guided by a follower 18 carried by the outer arm and engaging a template or pattern 19. The follower is coaxial with the tool so that the movements of the tool correspond exactly to those of the follower.

A router of this type is disclosed in my copending application Serial No. 402,982, filed January 8, 1954 to which reference may be had for details of construction. In general, the inner arm 10 is a hollow casting whose inner end is journaled on a post 20 upstanding from the base 11. At its other end, the inner arm is forked and the inner end of the outer arm 12 is disposed between the spaced portions 21 and 22 projecting from the forked end of the inner arm. The outer arm is secured to a vertical shaft 23 and the shaft is disposed along the axis $b$ and spans the arm portions 21 and 22 in which it is journaled. In this way, the shaft and hence the outer arm turn relative to the inner arm about the axis $b$ while the two arms swing together on the post 20 about the axis $a$ so that the arms may be flexed to permit the follower 18 to be guided around the template 19.

As shown in Fig. 2, the head 13 comprises a hollow cylindrical casing 24 sliding in vertical dovetail ways 25 on the free end of the outer arm 12. Such sliding is effected by a hydraulic reciprocating motor 26 which is mounted on the arm with its piston (not shown) connected to the casing 24 by a rod 27. Downward travel and hence the depth of the cut are determined by a stop 28 positioned on the arm 12 to be engaged by a lug 29 on the casing. The stop is adjustable and, for this purpose, is in the form of a vertical screw threaded into a bracket 30 on the end of the outer arm and turned by a knob 31.

In order to turn the inner arm 10 about the axis $a$, a reversible variable speed electric motor 32 is mounted on the base 11 and, through a gear transmission 33, drives a worm 34 which meshes with a worm wheel 35. The latter is coaxial with the axis $a$ and is coupled to the inner arm 10 so that this arm is turned about the post 20 by the motor 32. A similar motor 36, which also is mounted on the base, swings the outer arm 12 about the axis $b$. For this purpose, the motor is connected through a gear transmission 37 and a worm 38 to a worm wheel 39 fast on the lower end of a shaft 40. This shaft extends along the axis $a$ inside the post 20 and, at its upper end, it is connected to a horizontal shaft 41 through bevel gears 42. The shaft 41 extends from one end of the inner arm to the other and, at is outer end, it is coupled to the shaft 23 through bevel gears 43 thus completing the connection between the motor 36 and the outer arm 12.

The motors 32 and 36 are selectively energized in various proportions and directions so that they tend to swing the arms 10 and 12 and produce a resultant force which feeds the tool 15 into the work and, at the same time, holds the follower 18 against the template 19. This action is maintained in spite of the changing contour of the template by varying the energization of the motors to correspond to the particular portion of the template then engaged by the follower. The selective energization of the motors is controlled from a remote station by a manually operable selector 44 (Fig. 1) mounted on a stand 45. The construction of the selector and the manner in which it controls the motors are set out in detail in my earlier application identified above.

According to the present invention, the parts are arranged in a novel manner to improve the accuracy of the machine, increase its versatility and simplify its use and operation. To these ends, the follower 18 is located above the head 13 on the upper side of the outer arm 12 and, while it is coaxial with the cutter, it is at the same time remote from the latter.

In the present instance, the follower 18 is on the upper end of a plunger 46 (Fig. 2) which slides up and down in a vertical hole 47 formed coaxially with the cutter 15 in the upper side of the outer arm 12. The follower fits over a stud 48 projecting upwardly from the upper end of the plunger so that the follower may be removed simply by lifting it off the stud. The plunger is shifted by a hydraulic reciprocating motor 49 mounted on and disposed within the outer arm. The piston (not shown) of the motor is connected with a rack 50 whose teeth mesh with a pinion 51. The latter is journaled in the arm 12 and also meshes with teeth 52 formed on the side of the plunger. Thus, the plunger 46 and hence the follower 18 move up and down as the motor 49 is energized in one direction or the other. The energization of the motor may be controlled from the stand 45 by any conventional means well known in the art.

With the foregoing arrangement of the follower 18, the template 19 is bolted to a horizontal plate 53 which is disposed over the table 17 and above the outer arm 12. The plate is supported by posts 54 upstanding from the corners of the work table and is backed by I-beams 55.

By arranging the follower 18 above the outer arm 12, the accuracy with which the router reproduces the shape of the template 19 is increased. This is because of the chips from the work do not come between the follower and the template causing a false movement of the follower and hence the tool. Further, this arrangement also permits the follower to be the same size as the tool 15 so that the template may be made exactly to the dimensions desired to be reproduced without compensating for different sizes of the cutter and follower. Simply by lifting the follower off its supporting stud 48, the follower may be replaced with a different size one if the cutter size is changed.

Another advantage of the present invention is that the template 19 and the workpiece 16 are supported completely independently of each other. It is possible, therefore, to remove a finished piece and replace it with another without moving the template. Also, since the template is out of the way, the router may be used to cut grooves or form ribs by using it as a vertical milling machine.

This application is a continuation-in-part of my co-pending application Serial No. 402,982, filed January 8, 1954, now abandoned.

I claim as my invention:

A router comprising a horizontal work support having an upwardly facing work-supporting surface and adapted to hold a work piece, a horizontal template support having a downwardly facing surface spaced above said work-supporting surface and adapted to hold a template, means rigidly connecting said two supports, a stationary base, a tool head, means supporting said head on said base to dispose the head between said surfaces and to permit the head to move through a predetermined angle in a horizontal plane, a power operated spindle journaled on said head on a vertical axis and projecting toward said work support to carry a cutter of predetermined diameter in engagement with the work piece, a member connected to said head for vertical movement relative thereto and for bodily movement with the head in said horizontal plane, a circular follower of substantially the same diameter as said cutter mounted on said member above said spindle and disposed along said axis for engagement with the template, and a power actuator connected to said member and operable when energized selectively to raise and lower the member thereby to move said follower into and out of engagement with the template independently of said head.

References Cited in the file of this patent

UNITED STATES PATENTS

| | | |
|---|---|---|
| Re. 22,222 | Turchan | Nov. 10, 1942 |
| 799,825 | Behee | Sept. 19, 1905 |
| 2,395,525 | Wilkie et al. | Feb. 26, 1946 |
| 2,645,161 | Stuart et al. | July 14, 1953 |
| 2,693,737 | Smith | Nov. 9, 1954 |
| 2,723,598 | Mann | Nov. 15, 1955 |